April 3, 1973 D. M. STRATHEARN ET AL Re. 27,609

TIMER

Original Filed March 16, 1959 6 Sheets-Sheet 1

INVENTORS
DONALD M. STRATHEARN
JAMES M. THORNBERY
BY DALE F. WILCOX
Bayard B. Michael
ATTORNEY

TIMER

Original Filed March 16, 1959 6 Sheets-Sheet 2

INVENTORS
DONALD M. STRATHEARN
JAMES M. THORNBERY
DALE F. WILCOX
BY Bayard B. Michael
ATTORNEY

TIMER

Original Filed March 16, 1959 6 Sheets-Sheet 3

INVENTORS
DONALD M. STRATHEARN
JAMES M. THORNBERY
DALE F. WILCOX
BY Bayard H. Michael
ATTORNEY

TIMER

Original Filed March 16, 1959 6 Sheets-Sheet 4

INVENTORS
DONALD M. STHATHEARN
JAMES M. THORNBERY
DALE F. WILCOX
BY Bayard H. Michael
ATTORNEY INVENTORS
DONALD M. STRATHEARN
JAMES M. THORNBERY
DALE F. WILCOX
BY Bayard H. Michael
ATTORNEY

INVENTORS
DONALD M. STRATHEARN
JAMES M. THORNBERY
DALE F. WILCOX

BY Bayard H. Michael

ATTORNEY

United States Patent Office

Re. 27,609
Reissued Apr. 3, 1973

27,609
TIMER

Donald M. Strathearn, Arlington Heights, Ill., James M. Thornbery, Milwaukee, Wis., and Dale F. Wilcox, Aurora, Ill., assignors to Controls Company of America, Melrose Park, Ill.

Original No. 3,564,279, dated Feb. 16, 1971, Ser. No. 55,899, Sept. 14, 1960, which is a division of Ser. No. 799,780, Mar. 16, 1959. Application for reissue Nov. 1, 1971, Ser. No. 194,722
Int. Cl. H01h *43/12*
U.S. Cl. 307—141 23 Claims

Matter enclosed in heavy brackets [ ] appears in the original patent but forms no part of this reissue specification; matter printed in italics indicates the additions made by reissue.

ABSTRACT OF THE DISCLOSURE

The combination with a timer of the type having a motor for driving, a switch operating cam bank at timing speed through a transmission, of means for driving the cam bank to a preselected starting position comprising, a second motor for driving the cam bank through said transmission, means responsive to energization of the second motor to deenergize the first motor and responsive to deenergization of the second motor to energize the first motor, and clutch means operative upon deenergization of the second motor to disengage the second motor from the transmission to thereby remove the inertia of the second motor from the transmission.

This application is a division of application Ser. No. 799,780, filed Mar. 16, 1959, now U.S. Pat. No. 2,995,143.

Sequence timers operating on rotation of a drum can be visualized as having 360° rotation available for containing the desired programs. Each program requires a portion of the 360° available and it will be obvious that the greater the number of programs provided, the less space is available between programs. This space is utilized as a starting point and as the space is reduced the manual selection of the desired space becomes increasingly difficult until it becomes unreasonably difficult without mechanical or electromechanical assistance. To further simplify the process, it has become desirable to automatically position the timer at the desired starting point electromechanically in response to selection of a desired program by the operator actuating one (or more) switches which energize a positioning motor to drive the timer at high speed to the starting point. This has been done in copending Thornbery et al. application Ser. No. 799,781, filed Mar. 16, 1959 (assigned to applicants' assignee) with an interval timer combined with a seeking circuit and a separate high speed drive for the timer.

An object of this invention is to simplify the structure of Thornbery et al. and particularly to simplify the high speed drive. This has been done by having the high speed positioning motor drive the timer cam drum through the slow speed drive mechanism as compared to the Thornbery et al. arrangement utilizing two separate drives.

In order to provide a step (in the stepping drive) adequate to insure good switching on the cam drum periphery while retaining a workable size and torque requirement, it is generally found that a 6° or 7.2° step is desirable. With this limitation on the interval and with commercial requirements for more programs in the available intervals it becomes increasingly desirable to find some way to increase the functions which can be provided for by the timer. Reduction of the interval leads to switching problems and does not appear to be an attractive solution. Furthermore, often an entire interval must be devoted to an operation not requiring the entire interval (in time) for completion.

Another object of this invention is to provide means for increasing the functions possible within an interval of a timer sequence. This has been accomplished by what is called subinterval switching which in a sense is like a separate timer having a switching sequence which may be selected by the main timer during any desired interval to thereby provide a subsequence within a given interval of the sequence provided by the main timer. This makes possible the maximum utilization of an interval. Thus, while the timer remains at an interval for one minute, for example, the function may take less time and the remainder of the interval is, in effect, wasted. However, with subinterval switching the first portion of an interval may provide for (in a washing machine) "rinse" the remainder may be "drain." This may be accomplished in one interval. Other possibilities are pointed out hereinafter and many others will be apparent to those skilled in the art. Subinterval switching has the effect of incerasing the number of intervals without having to reduce the increment. Therefore, the subinterval switching makes possible more programs in a timer of given size and interval.

In connection with the high speed drive of the timer to its starting point, it is necessary to preclude advancing more than one step at a time.

It is another object of this invention, therefore, to provide a drive which is useable at high speed and prevents overstepping. This has been accomplished through use of a verge drive mechanism resulting in a drive suitable for both high and low speed operation. When combined with an antireverse ratchet, a further advantage is realized in that the timer cannot be advanced or reversed manually by actuation of the timer shaft. The latter feature allows an indicator to be mounted on the shaft, if desired, without fear that the operator will attempt to set the timer manually.

Another object of the invention is to provide a seeking circuit incorporating novel features of program selection whereby one selection switch can sequentially select two programs which should follow each other. Another feature of the circuit is the automatic selection of an "off" position in the event the selection switches are improperly actuated.

Other objects and advantages will be pointed out in, or be apparent from the specification and claims, as will obvious modifications of the single embodiment shown in the drawings, in which:

Figure 3:
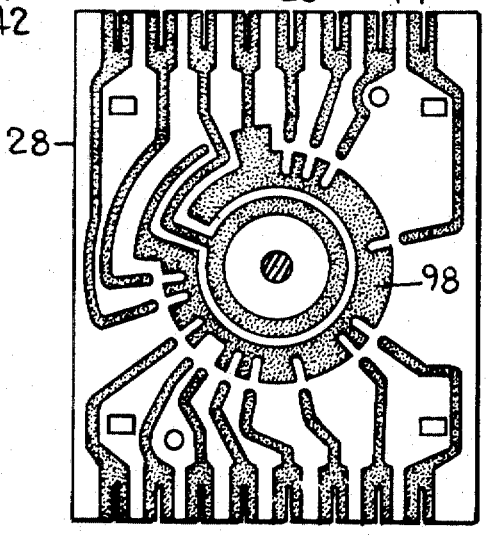
FIG. 3 is a view of the printed circuit board utilized in connection with the searching circuit.

The structure shown is built around a basic interval timer different from the usual timer only in that it has a great number of programs available within the 260° of rotation. Thus, the timer is provided with a pair of terminal boards, 20, 22 which carry the program switches generally designated 24. The terminal boards are carried between end plates 26, 28 and the switches are provided with cam followers which act on cams 30 carried on arbor 32. As will appear hereinafter, the end plate 28 has a printed circuit thereon as indicated in FIG. 3. The arbor 32 is journaled in the end plates for rotation and carries a drive ratchet 34 which is adapted to receive the impulses from the timer motor 36 or from the shaded pole motor 38. It will be noted that end plate 26 carries pawl 39 loaded by spring 42 into engagement with the teeth on the drive ratchet 34 to prevent reverse rotation of the timer arbor. Of course, since the timer is not manually actuated there is no danger of manual reverse rotation but there is some possibility of the drive mechanism to the ratchet 34 tending to drag the arbor back and the pawl 39 prevents such action.

With the exception of the printed circuit board, the mechanism described thus far is quite customary. The timer motor drives the ratchet through a novel drive mechanism. The motor 36 includes, as is customary, a gear reduction in the larger part of the motor housing and also includes an over-running clutch (not shown) which may be of any desired construction, to turn the motor shaft 40 in a counterclockwise direction. The shaft carries a molded disc including the cam 41. The purpose of this cam is similar to that of the prior art in that it gradually builds up energy in the drive mechanism and at its drop permits a rapid delivery of this energy through the drive to the arbor. Thus, a low torque motor can be used to deliver a high torque impulse. The cam drop is preferably of the slow drop type described more fully in copending application, Ser. No. 520,946, now U.S. Pat. No. 2,934,618. Lever or link 44 is pivoted on post 46 and is biased by spring 48 bearing against the frame and wound around the post to act against the vertical portion of the link (FIG. 2) to force the follower portion 50 into contact with the periphery of the cam 41. The left end (FIG. 4) of lever 44 carries verge 52 pivoted on pin 54. The toe or leading tooth 56 of the verge is biased into constant contact with ratchet 34 by spring 58. The heel or trailing tooth 60 will lift out of the teeth after each impulse. As the cam 41 rotates (usually at 1 r.p.m.) the lever 44 will rock in a clockwise direction slowly and the toe 56 of verge 52 will ride up the sloping portion of the next rearward ratchet tooth and shortly before the impulse is given to the lever the toe will drop into the next notch on the ratchet ready for delivery of the power stroke or impulse. When the follower reaches the drop portion of the cam 41, the lever will rapidly rock in a counterclockwise direction about its pivot 46 and drive the toe 56 against the ratchet. Simultaneously with this action, the verge 52 will rock about its pivot in a clockwise direction to jam the heel 60 into a corresponding ratchet tooth as may be seen in FIG. 4. With both the leading and trailing teeth engaged, it is impossible for the ratchet to rotate more than one step as imparted by the link and thus, the trailing tooth serves to prevent overstepping. This is of great importance in the present drive where the impulses are given rapidly and frequently during the high speed drive to be described hereinafter. Overstepping cannot, of course, be tolerated in this situation and the present drive prevents any overstepping and limits the indexing of the arbor to one step per impulse from the drive.

Figure 6:
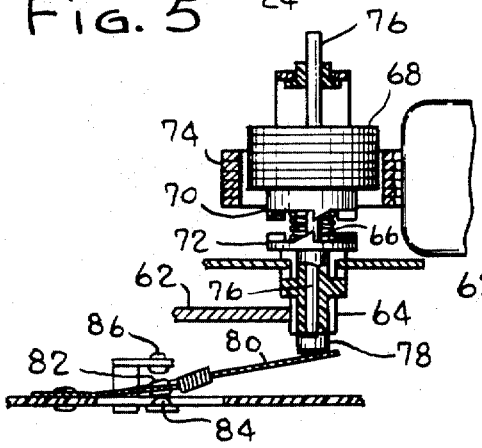
FIG. 6 is a view through the shaded pole motor and showing the switch operated by the motor when energized.
Figure 7:
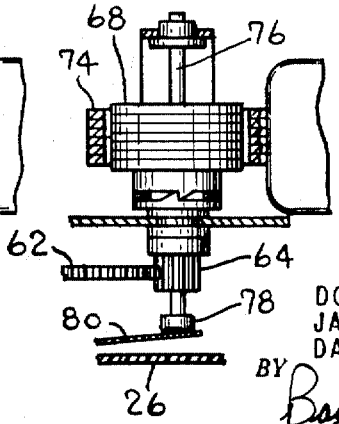
FIG. 7 is similar to FIG. 6 but shows the motor in its energized position.

As mentioned above, the cam 41 is carried on a disc 62, the periphery of which is in the form of a gear engaging pinion 64 which is adapted to be driven by the shaded pole motor 38. When the shaded pole motor is deenergized as shown in FIG. 6, the pinion is not connected to the motor since spring 66 biases the rotor 68 upwardly to move the clutch half 70 out of engagement with the clutch half 72 connected to the gear 64. When the motor is energized, as shown in FIG. 7, the rotor is pulled between the shaded poles 74 with a solenoid action and the upper clutch half 70 is pulled down into engagement with the lower clutch half 72 and the rotor of the shaded pole motor is connected to gear 64, to, in turn, transmit power to gear disc 62. This will, of course, rotate the cam 41 and deliver impulses to the ratchet on the arbor as before except that the impulses will be delivered quite rapidly (generally in the neighborhood of 6 per second). When the shaded pole motor is deenergized, the clutch spring 66 will immediately move the rotor back to the position shown in FIG. 6 in which the rotor is disengaged from the pinion 64. Thus, the inertia of the rotor is immediately removed from the drive when the shaded pole motor is deenergized and, hence, the inertia of the motor will not tend to overdrive the timer past the desired point.

A further feature to be noted in FIGS. 6 and 7 is that the lower end of the rotor shaft 76 is provided with a switch actuating boss 78 bearing on the actuating end of the switch blade 80 of a rather conventional snap acting switch. In the position shown in FIG. 6, the switch contact 82 is acting on the lower stationary contact 84. When the shaded pole motor is actuated as in FIG. 7, the switch blade 80 is moved down and throws the switch overcenter so that the contact 82 now contacts the upper fixed contact 86. The purpose of this transfer switch will be pointed out more fully hereinafter in connection with the wiring diagram.

Figure 1:
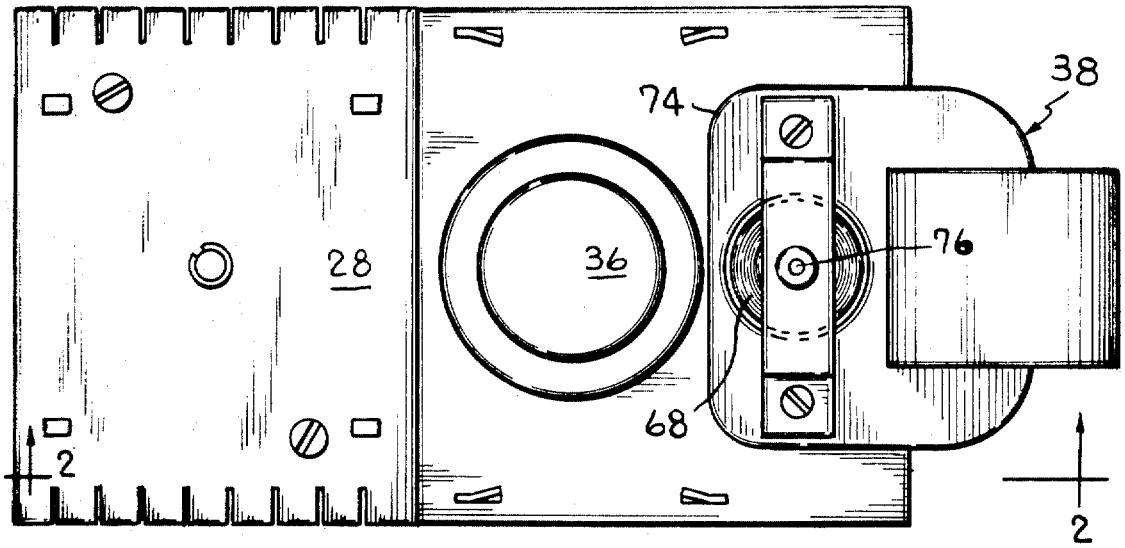
FIG. 1 is a top plan view of the timer.
Figure 2:
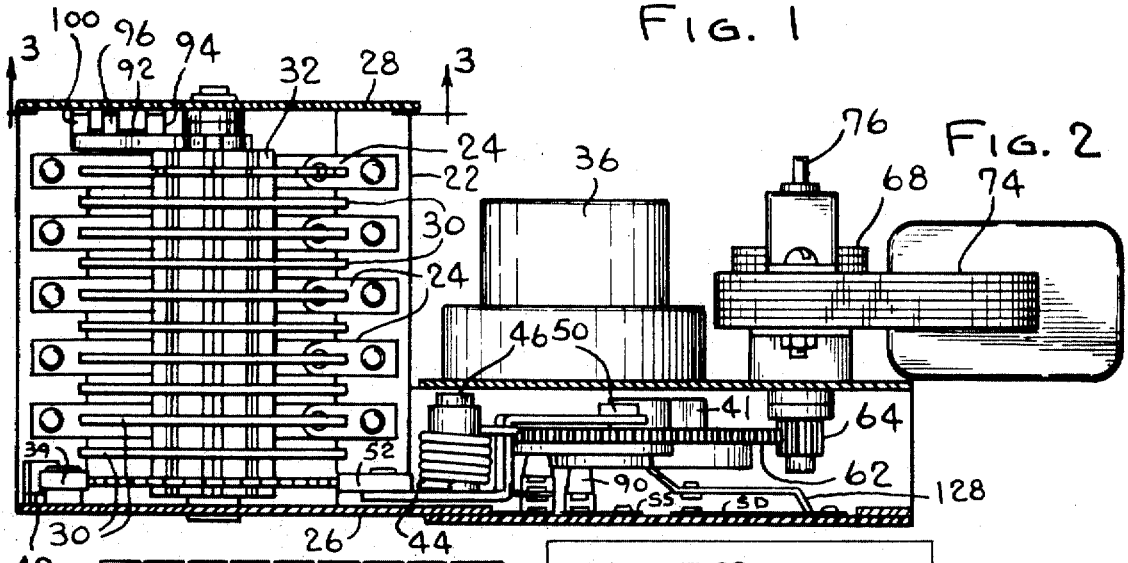
FIG. 2 is a front elevation, partly in section.
Figure 4:
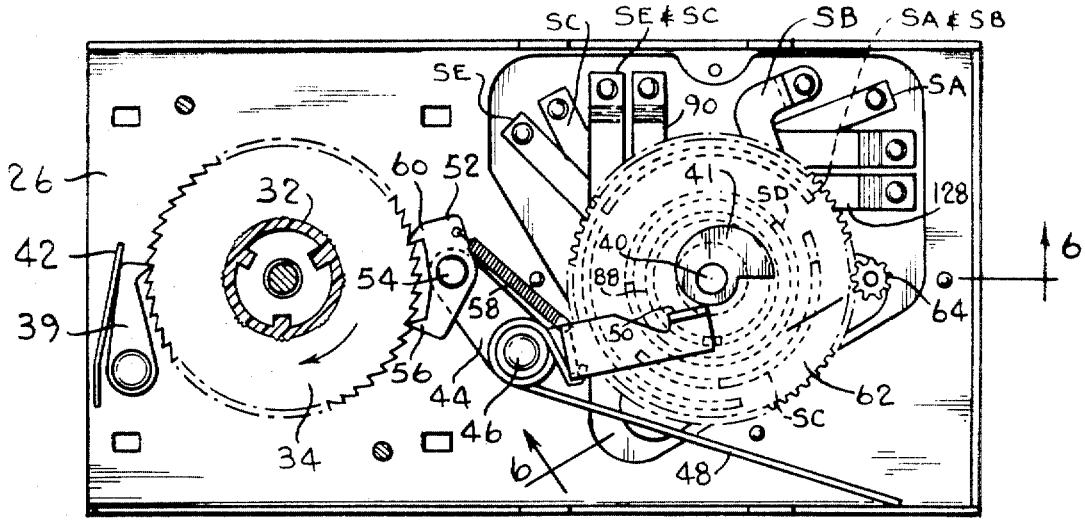
FIG. 4 is a view of the drive mechanism.
Figure 5:
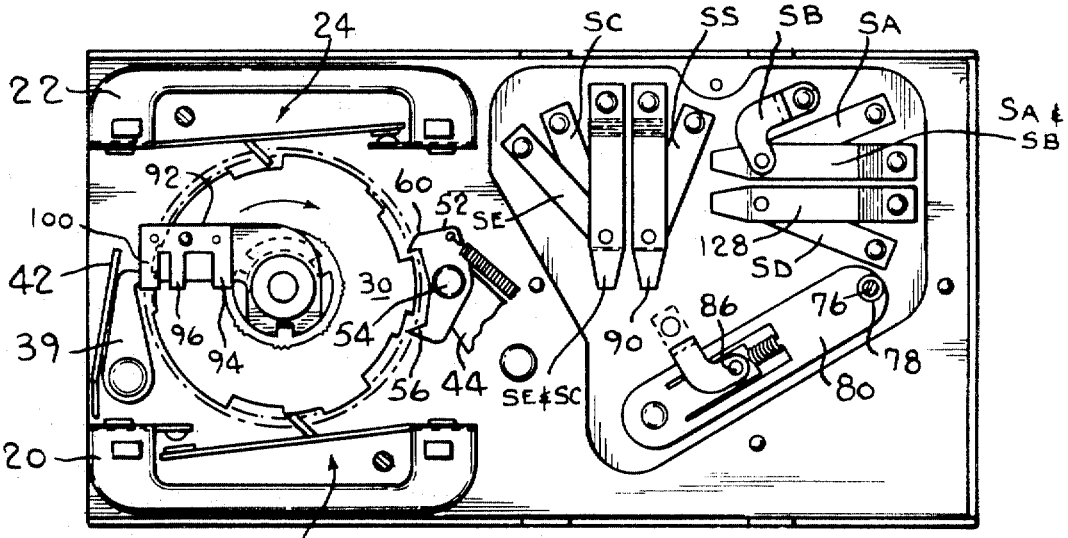
FIG. 5 is another view taken to show the general switching arrangement of both the main timer and of the subinterval switching.

In FIG. 4 it will be noted that there is shown in dotted lines on disc 62, a number of face cams which are on the underside of the disc and may be seen in part in FIG. 2. These cams actuate a group of switches only one of which need be considered at this moment. Thus, the inside cam 88 is designed to actuate follower 90 (FIG. 5) which, in turn, actuates the searching switch SS to open the switch SS once for each revolution of the disc.

Returning now to FIG. 3 which illustrates the printed circuit found on the end panel 28, it should be noted that the brush wiper 92 carried by the arbor for rotation therewith (FIGS. 2 and 5) wipes three circular paths on the printed circuit. Thus, the inner wiper arm 94 runs on the inner circular track while the middle wiper arm 96 runs on the outer portion of the nearly circular path 98 so as to overlie the cut out portions of the track. The outer wiper arm 100 wipes on the inner end of the various fragments which generally line up with the notches in the middle track 98. By a switching arrangement which will be more fully explained in connection with FIGS. 8 and 9, the slender portions opposite the notches are, in effect, placed into the notch (electrically speaking) when the corresponding switch is closed and, hence, the brush running on the inner track can complete the circuit across the inner and middle track. If the switch to one of the fingerlike circuit portions printed opposite a notch in the middle track is open, there can be no completed circuit and this will constitute an open circuit which the system is designed to seek.

Figure 8:
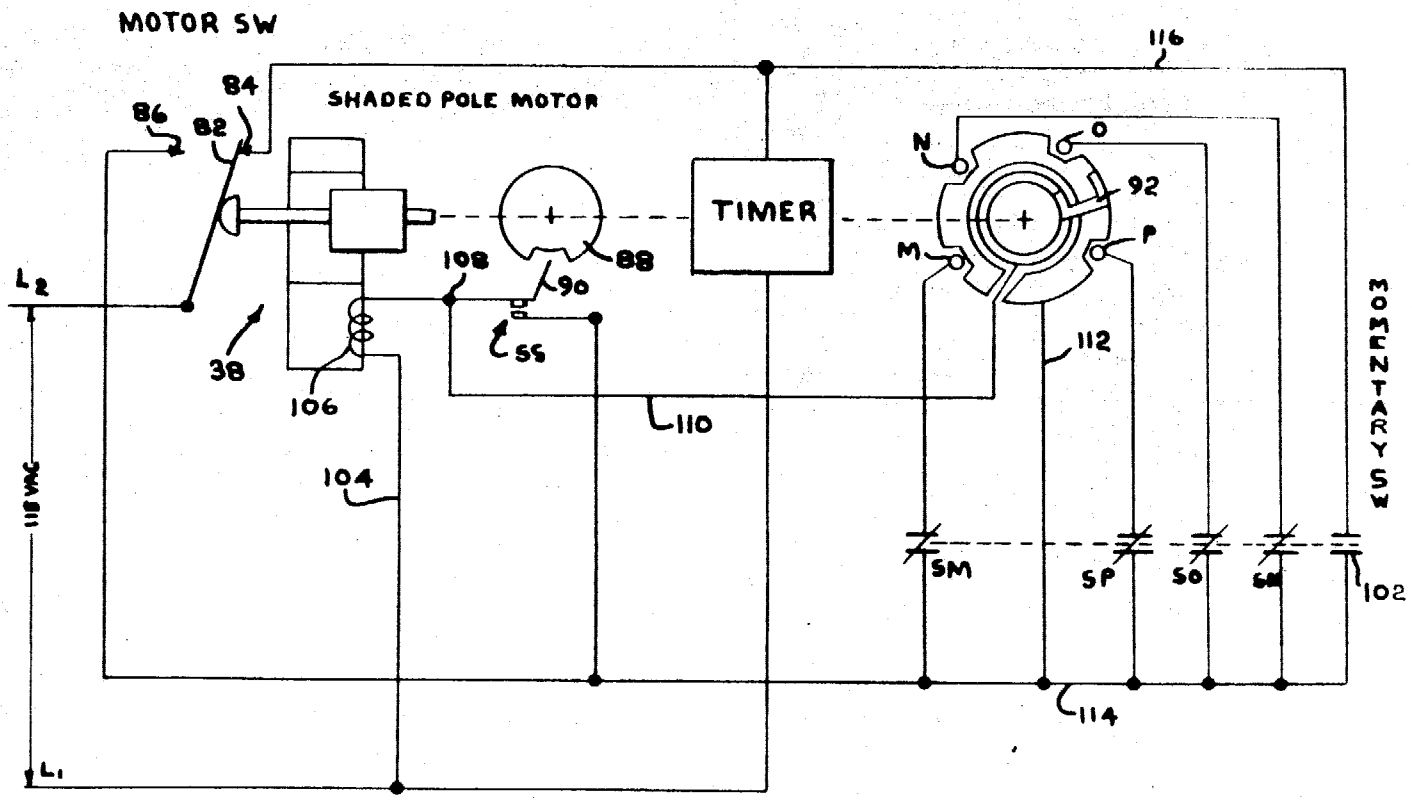
FIG. 8 is a schematic representation of the searching circuit and mechanism.

This seeking circuit is readily understood in connection with FIG. 8 which shows the essential portions of the circuit. This figure incidentally, shows the circuit relationship of the printed circuit and the brush 92 rather clearly and demonstrates that the brush merely acts as a jumper in the circuit arrangement. The small circular segments on the periphery of the representation of the printed circuit correspond to the fingerlike projections opposite the notches in FIG. 3. Due to space, they cannot actually be placed as in FIG. 8 and, hence, it is necessary to have the brush provided with two wipers. The printed circuit here is shown with four possible stopping points which are referred to as M, N, O and P which are regulated by normally closed switches as SM SN, SO and SP. These switches constitute the cycle selection switches. There is also a normally open momentary switch 102 and the cycle selection switches are so designed that actuation of one of these switches will also actuate the momentary switch 102. When switch SM, for example, is actuated, the momentary switch will be closed and the switch SM will be opened. Closure of the momentary switch will energize the shaded pole motor through the printed circuit and the brush. This circuit is as follows: L1 to the lead 104 through the motor winding 106 to junction 108 and from there through lead 110 to the printed circuit board, through the wiper, to lead 112 and line 114 to the momentary switch 102 and from thence to line 116 to contact 84 on the motor switch 82 to line L2. This energizes the shaded pole motor and the solenoid action of the rotor throws the switch 82 to contact 86 to establish a holding circuit shunting the momentary switch and breaking the circuit to the timer motor. At this time the shaded pole motor drives the timer at high speed to advance the wiper 92 around the printed circuit. The advance will, of course, be step by step. After each step the cam 88 allows the search switch SS to open. The searching switch SS is normally closed and in parallel with the printed circuit switches. If the circuit through printed circuit is complete when the searching switch opens the shaded pole motor will continue to advance the timer at the rate of about 6 impulses per second. When the brush on the printed circuit reaches the contact segment M which is in series with the open cycle selection switch SM, opening the searching switch will cause the shaded pole motor to be deenergized since the circuit through the motor coil 106 is broken. Immediately upon deenergization of the shaded pole motor, spring 66 returns the rotor to the position in which it disengages the drive and also restores the rotor switch 82 to its normal position. In this position the timer will now be energized by reason of the face cams driven by the timer have caused closure of the circuit including the timer motor. This will appear more fully in connection with FIGS. 9 and 11.

The simplified diagram of FIG. 8 should make the operation of the searching circuit quite clear. It should be noted that due to the fact that the searching switch SS is normally closed and is closed during the advance of the brush, the printed circuit is, during the impulse, shunted by the searching switch. Between each impulse imparted to the timer and its brush 92, the searching switch opens and, hence, the testing of the circuit condition is, in effect, accomplished at the searching switch rather than at the brush and thus avoids switching on the printed circuit board which could conceivably have adverse affects. It should be noted, however, that as further experience is gained both with respect to printed circuit boards and with respect to the capacities of a timer arrangement of this type, it appears more and more likely that the searching switch can be eliminated if desired.

With the understanding of the searching circuit gained from the consideration of FIG. 8, the complete wiring diagram of the timer, the searching circuit and the washing machine can now be considered, noting, however, that the circuit to be described now is merely representative of one type of circuit and the present invention can be applied to many types of control circuits. Furthermore, it should be noted that in the system shown here the searching arrangement seeks an open circuit. The system can readily be modified to seek a closed circuit when desired. Such a circuit is shown in the copending application of Thornbery et al. Ser. No. 799,781.

Figure 9:
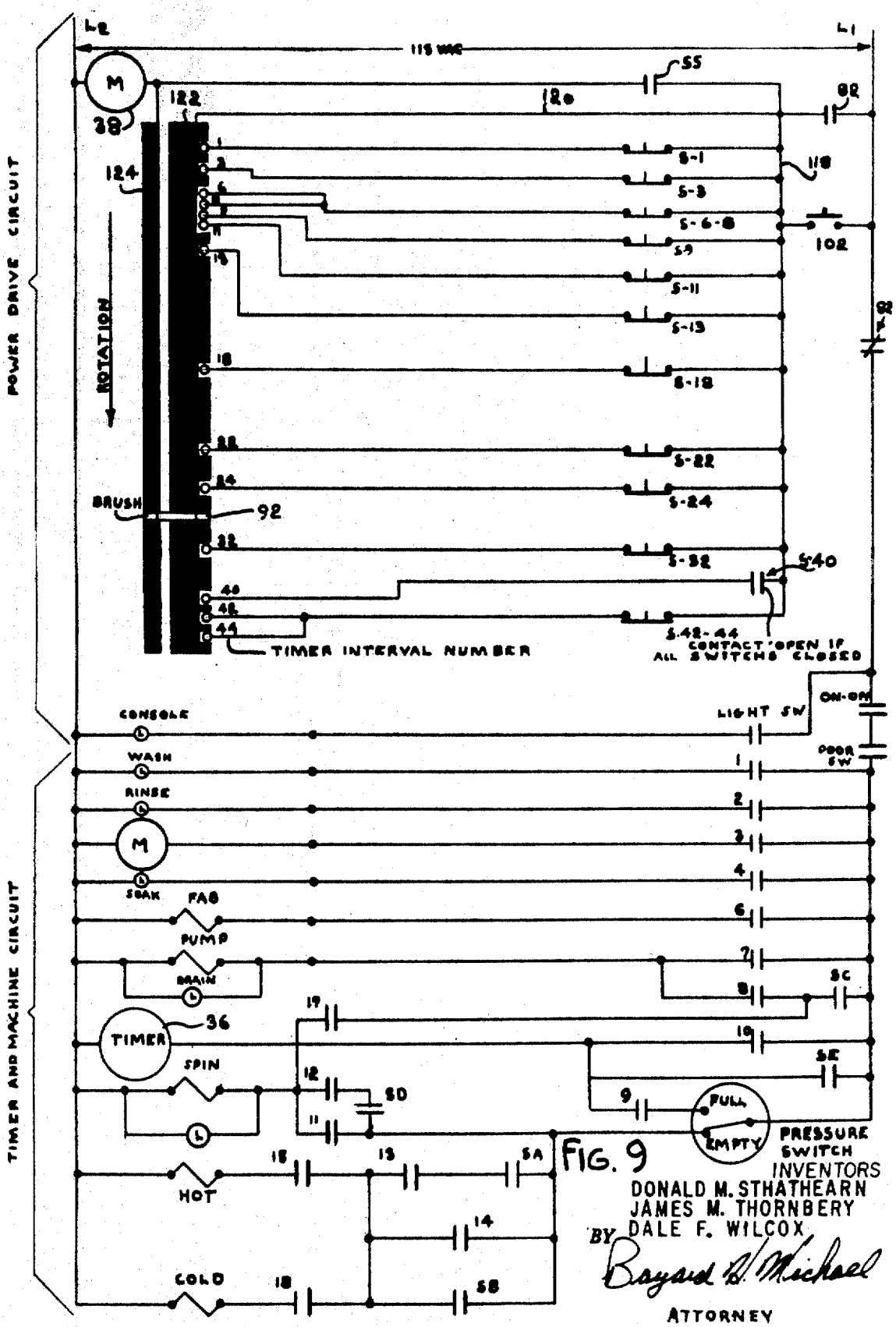
FIG. 9 is a wiring diagram for both the searching circuit and the entire washing machine and timer circuit.

Turning now to FIG. 9 and particularly to the upper portion thereof, the printed circuit is here represented by the dark strip over which the brush 92 travels in the direction indicated by the arrow labeled "rotation." Along the right-hand of the side of the wider of the two printed circuit strips, there is indicated the various starting points which may be selected by operating one of the cycle selections switches. These switches bear the legend S1, S3 etc. with the S standing for cycle selection switch and the numeral 1 indicating the starting point at interval number 1, for example. It will be noted that there is shown a switch S6–8 and this indicates the same switch may be actuated to position the brush and, hence the timer to start at either interval 6 or 8 and the purposes underlying this will be explained more fully hereinafter. It will be noted that this wiring diagram illustrates the searching switch SS and the shaded pole motor switch 82, the latter being shown in two locations in order to indicate its functions completely. The momentary switch 102 is also shown. With the showing of FIG. 8 in mind, it will be easy to determine the manner of operation. For example, actuation of one of the normally closed cycle selection switches will, as mentioned above, also actuate the momentary switch 102. Since the timer is designed to stop at the end of a cycle or program in an "off" position with the brush bridging the printed circuit so as to result in closing the circuit at this point, this will result in current flow to the shaded pole motor from line L1 through the momentary switch to the common line 118 and from thence to line 120 and the printed circuit strip 122 through the brush to printed circuit strip 124 and from there through the motor 38 to line L2. This, of course, energizes the motor and changes the position of the shaded pole motor switch 82. Thus, the shaded pole motor switch in line L1 will open to deenergize the entire washing machine circuit, while the shaded pole motor switch also closes the circuit from line L1 to line 118 to shunt the momentary switch and establish a holding circuit. Now then, the shaded pole motor will rapidly advance the timer and its brush through the sequential intervals searching for the open circuit. After each impulse to advance the timer, the searching switch SS will open to allow the circuit condition to be tested. For example, if the selection switch S11 has been opened, the brush would continue around the timer until it landed at S11 and the searching switch SS opens so that the circuit through the shaded pole motor would have to pass through the printed circuit board. At this time, since the switch S11 is open, the current flow to the shaded pole motor will be interrupted and the rotor will retract to reverse the position of the switch 82. This, in turn, will allow current flow to the timer motor 36.

Figure 11A:
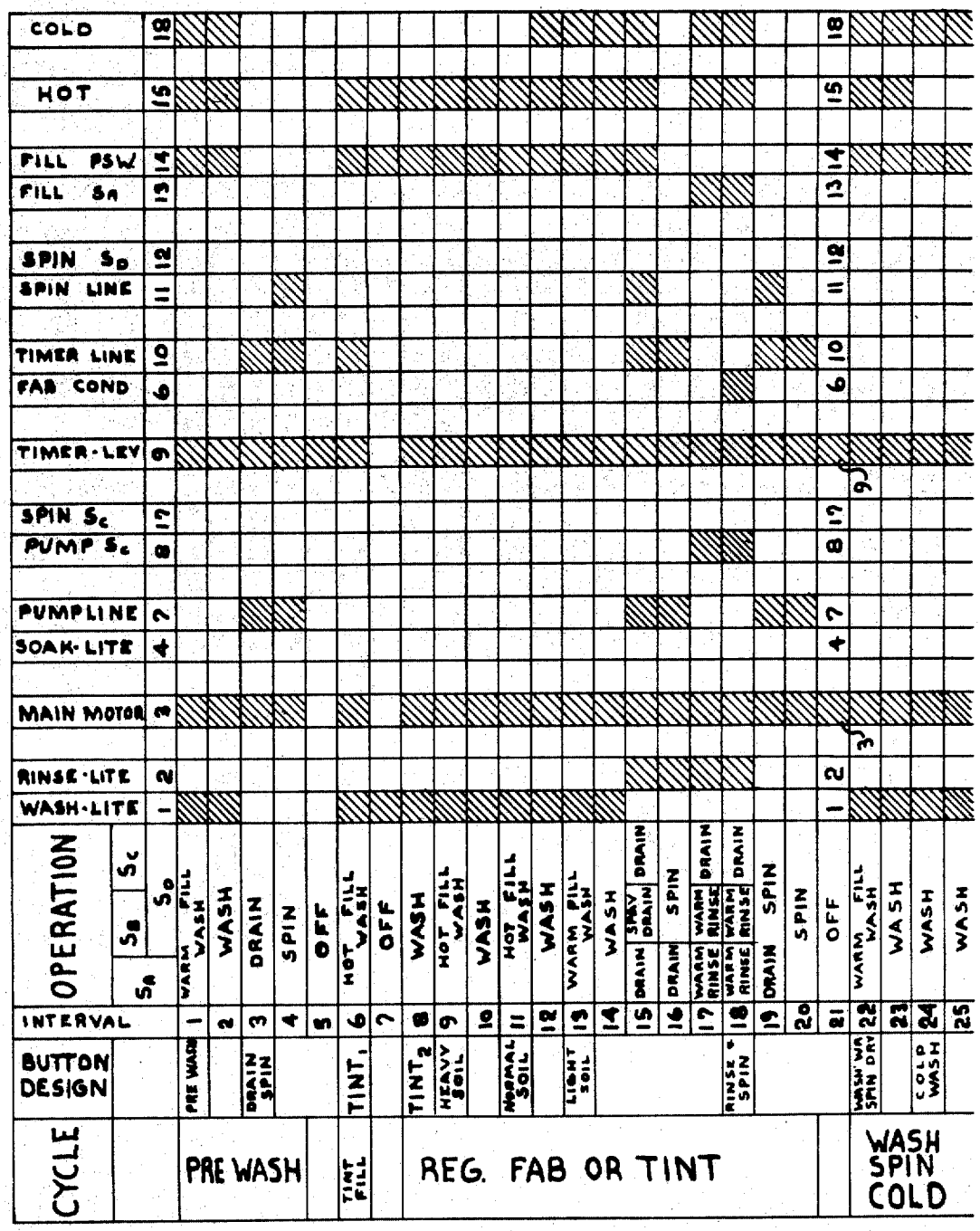
FIGS. 11, A and B, show the program achieved by the present arrangement.

At this point it is well to consider the chart in FIGS. 11A and B which show a sample program available with this arrangement. It will be noted that the cycle selection switches (FIG. 9) bear the numerals indicating the interval at which the timer will be stopped in its rapid advance. These intervals correspond to those intervals shown on FIG. 11 under the interval column and constitute the start of different programs. It will be noted that FIG. 11 also shows, in the various labeled columns, the condition of the various switches operated by the timer cams. These switches 1, 2, 3, 4 etc. appear in the lower portion of FIG. 9 and control the washing machine apparatus or functions associated therewith as indicated on the diagram (FIG. 9) as well as on the chart of FIG. 11. The chart is easy to read. For example, in the situation given above with the starting point at interval 11, the wash light (merely an indicator light) will be energized as will be the main motor through timer cam switch 3, the timer will be in circuit with the closed switch 9 and switches 14 and 15 will also be closed. It will be noted that the washing machine is provided with a pressure switch 126 and, of course, at the start of this cycle, the "empty" contact will be made. Hence, the timer motor 36 will not be energized until such time as the pressure switch acts to make the "full" contact. However, with the energization of switches 14 and 15, the solenoid actuating the hot water valve will be open and the tub will start to fill. When the desired level has been reached, the pressure switch will transfer to the "full" contact whereupon the timer motor will start operation. Thus, even though the tub may take four minutes to fill, only one interval has been utilized for the fill operation and a full minute of time remains to be used after the filling before the next step of the stepping mechanism.

Reference to the chart will show that the timer could have been started, for example, at interval 13 which would result in a warm fill rather than a hot fill. If started at interval 11, however, as the timer steps through interval 13, nothing will happen as regards filling since the pressure switch will have already transferred to the full contact and, hence, the mere fact that solenoid switch 18 is closed in interval 13 will have no affect and no cold water will be taken into the tub. The timer will continue stepping until it reaches interval 21 at which time the timer is turned off.

Before going on with other aspects of the present invention, it should be noted that the cycle selection switches are coupled with a switch S40 which will be open if all the selection switches are closed. For example, if the operator presses a latching type selection switch with an overtravel mechanism for establishing the momentary switch 120 and then releases the switch which fails to latch in its open position, it will be appreciated the motor would now be energized and could go on searching for an open circuit not existing. Therefore, the switch arrangement is so designed that if all the cycle selection switches are closed, the switch S40 will be open and this, as can be seen by reference to the chart in FIG. 11, is an "off" position and, hence, no harm has been done and the machine will not continuously run searching for a condition which does not exist.

Figure 10:
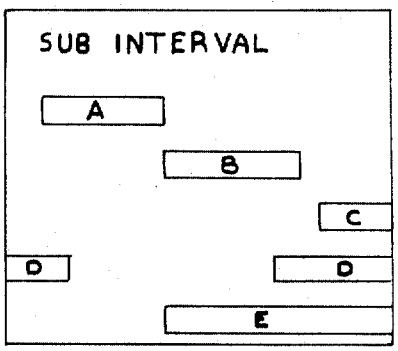
FIG. 10 is a schematic representation of the subinterval switching sequence.

Reference was made earlier to the provisions of multiple sequential functions within a given interval. This arrangement will now be explained. As was mentioned earlier, the gear disc 62 was provided with a plurality of circular face cams, the inner one of which operates the search switch SS. There are additional cams on the disc which operate what we term "sub-interval switches." Now then, starting from the inner cam, which operates the searching switch, the next cam track (progressing outwardly towards the periphery of the disc) will operate the subinterval switch D through the follower 128 cooperating with switch labeled SD. The next cam track (progressing outwardly) operates switches SC and SE while the outermost cam track operates the subinterval switches SA and SB. Now then, in FIG. 10, there is shown a chart of the sequence of operation of the subinterval switches. The rectangle in which the labeled rectangles appear represents, from left to right, one interval as a matter of time and thus progressing from the left-hand margin, it will be noted that shortly after the start of an interval, switch SA is made and remains closed for approximately one-third of a cycle. Switch SA is thereupon opened and switch SB closes. At this time, switch SE also closes. SB remains closed for approximately one-third of a cycle and then opens, followed shortly by the closure of SC. SD closes shortly before the opening of SB and SD remains closed into the next interval as indicated by the small portion on the left-hand margin.

Figure 11B:
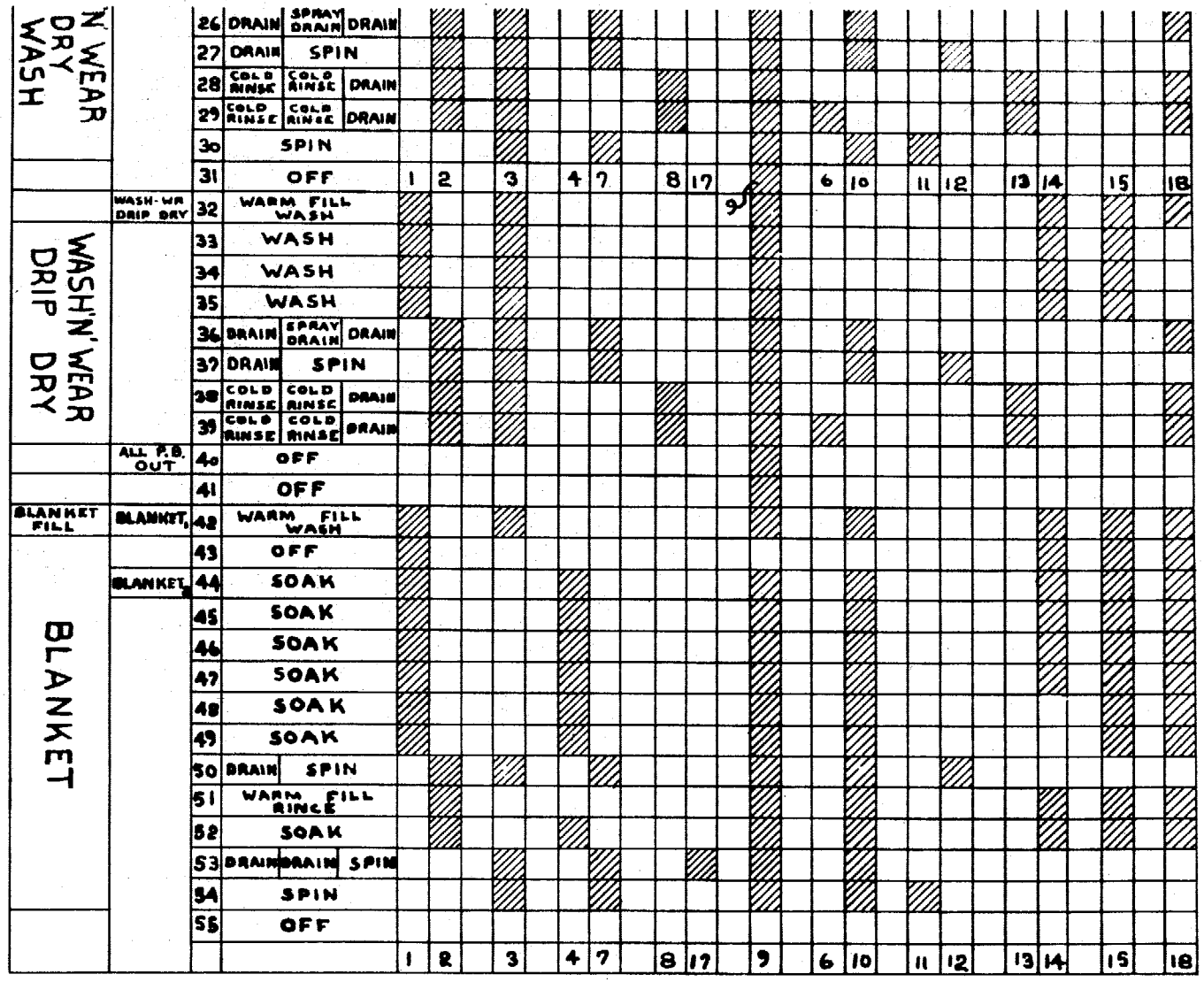

The subinterval switches are included in the main timer circuit as indicated in FIG. 9 and consideration of FIG. 9 in combination with the chart of FIG. 11 will now demonstrate the novel functions possible through such an arrangement. Refer, for example, to the operations achieved at interval 17. Here, it will be noted, the same interval is used both for a rinse and for draining. Under former practice, this was obviously incompatible since the drain pump would have to be energized at the same time it was desired to fill the tub. However, an analysis will show the practicality of the present arrangement. At interval 17 the pump solenoid switch 8 is closed but it cannot operate the pump until SC also closes. Hence, the pump cannot operate until the last third of the interval. Now then, the timer motor 36 is connected to the power supply through the level switch and cam switch 9 which means that upon the timer dropping into interval 17, the timer motor will turn off and will stay off until the tub has been filled. This has the effect of stretching the interval to one long enough to allow the tub to fill regardless of the time required. It is obvious that during the draining operation, which, as explained before, can only occur the latter third of the interval, would not be very effective if the tub were simultaneously undertaking to fill. Therefore, the fill is controlled through timer switch 13 which is in series with switch SA. Also closed at this time are the hot and cold solenoids 15 and 18. However, to fill the tub after the timer drops into this interval, the circuit passes through the pressure switch and switch SA and the timer switch 13 to the solenoids and causes filling which will continue with the timer totally at rest until the pressure switch trips to close the full contact and this will then reenergize the timer. The timer having been reenergized, the subinterval switching resumes operation and, before long, the switch SA will open and no more filling can occur. When subinterval switch SC closes in series with timer switch 8, the pump will go into operation and start pumping down the contents of the tub. Obviously this would affect the pressure switch and would turn off the timer motor with the result that the timer could not get out of this interval. This is accommodated by subinterval switch SE which is in circuit with the timer 36 shunting the timer line switch 10. Obviously the line switch 10 could not have been closed during all this operation since a complete fill for the rinse purposes would not have been accomplished. It will be apparent, therefore, that the use of the subinterval switching has accomplished within one interval, the functions which would normally require at least two intervals. Furthermore, due to the arrangement of the subinterval switching, a greater period of time has been spent in the interval than the actual theoretical duration of the interval. Thus, the fill alone could take 4 or 5 minutes and there is still time within this interval to effect the draining operation. Another advantage in this system is that where the function desired requires less time than a complete interval, the complete interval need not be devoted to accomplishment of the function. Thus, the draining can be accomplished within about one-third of the interval.

When the timer advances to step 18, this function is again repeated. In going into interval 19, the pump is connected across the line by closure of switch 7 and the washer continues to pump down until subinterval switch SD closes in series with timer switch 12 to energize the spin. It will be noted that interval SD extends into the subsequent interval and this is to insure against the spin solenoid and the associated transmission being deenergized and reenergized between intervals.

The multiple functions thus afforded by subinterval switching are much the same in the other intervals where the subinterval switches are cut into the circuit except that in interval 36, for example, during which the drain pumps are working constantly, there is a spray during subinterval B. Thus, in the first portion of the interval, the pump pulls down the water level so that the pressure switch will trip over to the empty contact and when SB is made the circuit through the closed timer switch 18 will be made to energize the cold solenoid and give a cold spray. With the provision of the pressure switch, the subinterval switch SB is not effective unless the pressure switch is in the empty position and either or both of the water solenoids 15 and 18 are closed.

One further feature afforded by the present arrangement should now be pointed out. As mentioned above, the cycle selection switch S6–8 in effect, provides two stopping points, reference to the chart will demonstrate the purposes of the two starting points. When this switch is first actuated, the tub gets a hot fill and agitation for the interval (6) period and then in interval 7, the machine turns off. This permits the clothes to be soaked . . . the machine may be loaded and the S6–8 actuated and the housewife may then leave the scene with the knowledge that the machine will turn off and allow the clothes to soak. When she presses the same button again, it will advance to interval 8 and then go into the timing speed to the "off" position at interval 21. It will be noted that one additional cycle selection switch has this feature. This is switch S42–44 where when the blanket button is first depressed, a warm fill will be obtained and the blanket may be soaked. Depressing the button again will start a timed soaking operation as indicated in intervals 44 through 49 whereupon the machine will go into the drain and rinse operation etc. finally turning off at interval 55. One switch, therefore, selects a sequence as it is operated sequentially. S6–8 when first actuated must stop at interval 6 and when again actuated will stop at interval 8. The added versatility in programming at virtually no cost is readily apparent.

The present invention constitutes an improvement over Thornbery et al. application Ser. No. 799,781 insofar as the timer motor and the shaded pole motor use a common drive mechanism to step the timer. The drive includes an improved stepping mechanism preventing overstepping as explained more fully above. This invention also includes the subinterval switching which, as explained above, greatly adds to the versatility of the machine. Heretofore, it was necessary to devote an entire interval to accomplishing a given function even though the function did not require the entire interval. By utilizing subinterval switching, multiple functions can be performed within a given interval. A further feature is to be noted in connection with the subinterval switching. It is possible with this system, to combine the better features of the stepping or interval timer and the creep type timer, the subinterval switching arrangement being essentially a creep type timer. In the customary interval timer, a plurality of circuits are theoretically made simultaneously upon the timer being stepped. In practice, however, there are manufacturing tolerances and there will be some slight spread in the switch closing and, with certain circuits, it is possible to have a momentary short circuit as a result of improper operation of the switches. This is true in a switch which passes all manufacturing inspection since it is a result of very slight variation still within manufacturing tolerances. With the present arrangement, however, it is possible to close a circuit prior to the normal interval for the closure and upon stepping to then transfer the control from the subinterval switch to the main timer. This will insure the proper sequencing and, as can be seen, frees the designer from the strict parameters laid down by the usual stepping arrangement. Now the designer is able to sequence a circuit independently of the interval timer and to later transfer control of the circuit back to the interval timer.

Although but one embodiment of the present invention has been illustrated and described, it will be apparent to those skilled in the art that various changes and modifications may be made therein without departing from the spirit of the invention or from the scope of the appended claims.

We claim:

1. The combination with a timer of the type having a motor for driving, a switch operating cam bank at timing speed through a transmission, of means for driving the cam bank to a preselected starting position comprising, a second motor for driving the cam bank through said transmission, means responsive to energization of the second motor to deenergize the first motor and responsive to deenergization of the second motor to energize the first motor, and clutch means operative upon deenergization of the second motor to disengage the second motor from the transmission to thereby remove the inertia of the second motor from the transmission.

2. The combination of claim 1 in which the transmission imparts a step-by-step motion to the cam bank, and the first motor is provided with a clutch allowing the transmission to overrun the first motor.

3. The combination of claim 2 including means for deenergizing the switches operated by the cam bank while the second motor is energized.

4. The combination of claim 3 including electric circuit means operatively connected to the cam bank and operative upon energization of the second motor to maintain energization of the second motor until a preselected circuit condition is reached, said electric circuit means including manually operable means for preselecting the circuit condition.

5. The combination with a sequence timer of the type having a plurality of function controlling switches operated by a cam bank driven at timing speed by a motor through a drive mechanism including a member rotating at a speed greater than timing speed, the timing speed of the cam bank causing sequential operation of the switches at predetermined intervals, of means for increasing the functions effected during an interval comprising, a plurality of cams rotating with said member at a speed greater than the timing speed, switches operated by said cams, and circuit means including certain of the switches controlled by the cam bank and the switches operated by the cams carried by the member so that the sequence of the switches operated by the member cams may be employed within an interval of the cam bank to provide subintervals within the interval of the cam bank.

6. The combination of claim 5 in which the drive mechanism imparts a step-by-step motion to the cam bank at spaced intervals and the member rotates continuously while the motor is energized.

7. A sequence timer including, a cam bank, function switches actuated by the cam bank, a timer motor, means operatively connecting the timer motor to the cam bank for driving the cam bank at timing speed, and a second motor operative when energized to drive the cam bank at high speed, means to disconnect the second motor from the connecting means when the second motor is deenergized, and an overrunning clutch between the timer motor and the connecting means to overrun the timer motor during the operation of the second motor.

8. A timer according to claim 7 including a normally closed switch operable when open to interrupt the power supply to the switches operated by the cam bank, and axially moving means responsive to operation of the second motor to open the normally closed switch.

9. A timer according to claim 8 in which the last named means is the rotor of the second motor.

10. A timer according to claim 7 in which the connecting means imparts a step-by-step motion to the cam bank and includes means operative at each step to prevent the cam bank from moving more than one step.

11. A timer having a cam bank for operating function switches and movable over a prescribed path, the cam bank having a plurality of starting points in said path, means for driving the cam bank over the path, a searching circuit associated with the cam bank and including a circuit portion movable with the cam bank, a plurality of cycle selection switches in said circuit with each having a normal condition and an actuated condition, the actuated condition of a selection switch establishing a circuit condition sought by the moving circuit portion and corresponding to a starting point, means for energizing the drive means, means responsive to the moving circuit portion reaching the selected starting point to deenergize the drive means, at least one of the selection switches acting to establish a sought circuit condition at two places in the timer path.

12. A timer according to claim 11 in which the two sought circuit conditions established by the last mentioned selection switch are the starting points of two separate programs of the timer and the programs are sequential in the path being separated by a cam bank position in which the timer is off.

13. A timer according to claim 12 including an "off" switch normally establishing a circuit condition sought by the moving circuit portion with the circuit condition corresponding to an "off" position in the cam bank path, actuation of any selection switch serving to actuate the "off" switch to a position in which the sought circuit condition associated therewith does not obtain.

14. A timer according to claim 11 in which the drive means is a high speed drive and including, a timing speed drive means for the cam bank, the latter drive means being energized when the former drive means is deenergized.

15. A timer according to claim 14 in which both drive means drive the cam bank through a step-by-step mechanism which includes, a ratchet connected to the cam bank, a pivoted lever, a pawl carried by the lever and engaging the ratchet, a cam for rocking the lever to back-step the pawl and to rapidly advance the pawl and means operative during the rapid advance of the lever to prevent the pawl from leaving the ratchet whereby to prevent overstepping.

16. A timer according to claim 15 in which the last named means comprises a second pawl.

17. A timer according to claim 16 in which both pawls are carried by the lever and are in the general form of a verge.

18. A timer having a rotatable cam bank, function switches controlled by the cam bank, a timing motor, a cam disc driven by the motor and operatively connected to the cam bank, a high speed motor selectively connectable to the cam disc to drive the cam bank at high speed, a plurality of cams on the cam disc, a plurality of subinterval switches operated by the disc cams and connected in circuit with a plurality of said function switches whereby to modify the functions controlled by the function switches.

19. A timer according to claim 18 including switch means operative to deenergize the function switches during operation of the high speed motor.

20. A timer having a rotatable cam bank, function switches controlled by the cam bank, a ratchet on the bank, a pivoted lever carrying a pawl for advancing the ratchet when the lever is actuated, a cam for actuating the lever, means acting on the ratchet during the advance motion of the lever to prevent the ratchet overstepping the pawl, a timing motor for driving the cam to index the bank at timing speed, a high speed motor for driving the cam at greater speed to index the bank at high speed, means for energizing the high speed motor, said high speed motor being disengaged from the cam when deenergized means responsive to energization of the high speed motor to deenergize the function switches, a fixed circuit board having elements of many circuits thereon, a brush carried by the bank to contact and bridge the circuit elements whereby to test the circuit associated with each rotational position of the cam bank, manually operable means for establishing a circuit response condition at a desired position of the cam bank whereby contact of the brush with the circuit elements at the desired position will cause a circuit response deenergizing the high speed motor, a plurality of subinterval cams rotatable with the cam when the cam is driven by the timing motor, a plurality of subinterval switches operated by the subinterval cams, and circuit means connecting the subinterval switches in circuit with various function switches whereby to modify within an interval the operation of the various functions controlled by the function switches.

21. A timing device including, an interval timer including a cam driven by a motor in a step-by-step manner and interval switches operated by the cam according to a prescribed sequence, a creep timer driven by the same motor during the interval between the step-by-step advances of the cam and operating a plurality of secondary switches in timed sequence, said secondary switches being connected in circuit with certain of the interval switches whereby the interval switches determine when and which of the secondary switches is effective.

22. A timer according to claim 21 in which one of the circuits controlled by the subinterval switches includes the motor.

*23. A sequence timer comprising a member movable over a predetermined path for operating switches sequentially, a switch element movable with said member, a fixed switch element cooperable with said movable switch element to establish a circuit condition, a motor for moving said member along said path in a step-by-step manner and in circuit with said switch elements, and switch means operated during operation of said motor to shunt said switch elements during each step of the movement of said member whereby the circuit continuity to the motor through said elements is not determined until the step has been completed.*

References Cited

The following references, cited by the Examiner, are of record in the patented file of this patent or the original patent.

UNITED STATES PATENTS

| | | | |
|---|---|---|---|
| 2,584,535 | 2/1952 | Belamin | 317—11 A |
| 3,011,079 | 11/1961 | Mellinger | 307—141.4 |
| 2,103,805 | 12/1937 | Williams | 318—446 X |

FOREIGN PATENTS

| | | |
|---|---|---|
| 570,342 | 8/1958 | Belgium. |

HERMAN J. HOHAUSER, Primary Examiner

U.S. Cl. X.R.

307—136; 317—11 A, 11 E